3,151,537
PHOTOGRAPHIC BETWEEN-THE-LENS SHUTTER
Rolf Noack and Werner Hahn, both of Dresden, Germany, assignors to VEB Kamera- und Kinowerke Dresden, Dresden, Germany
Filed May 4, 1961, Ser. No. 107,806
5 Claims. (Cl. 95—42)

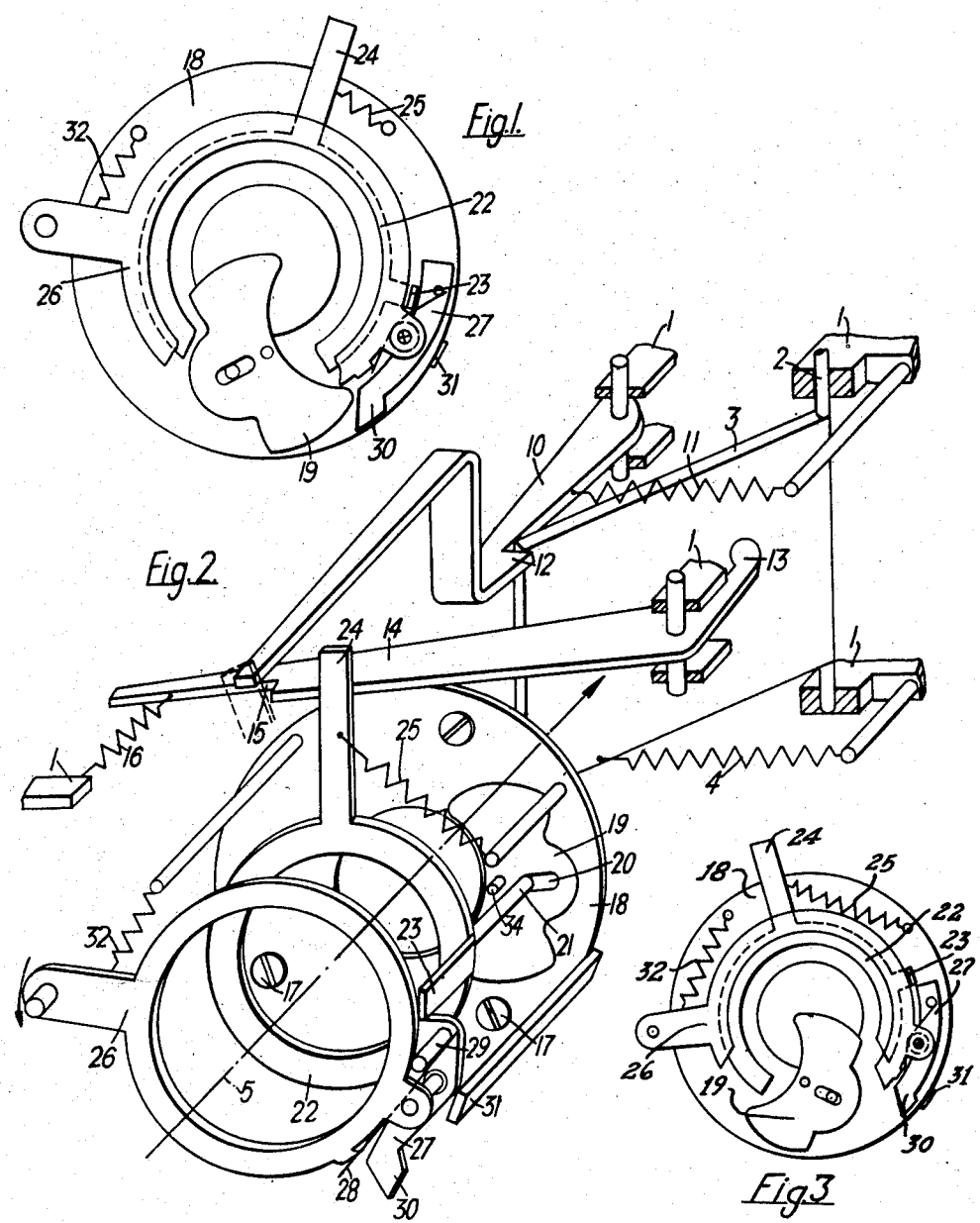

The present invention relates to a photographic between-the-lens shutter with a plurality of blades moved by a spring-loaded drive ring and a depressable release lever, which in its actuation is temporarily couplable with the drive ring for the purpose of cocking of its drive spring (automatic shutter).

The known between-the-lens shutters of this kind are not used in monocular mirror reflex cameras, because they contain no suitable additional opening devices for the blades, whereby apart from the normal shutter function the object of which a picture is to be taken could be made visible in the view finder. The additional opening devices known in cocked shutters are not suitable for use in automatic shutters, because here apart from or with the cocking operation of the shutter mechanism the blades are opened for the purpose of viewing through the view finder. In the case of automatic shutters on the other hand the blades previously opened for the purpose of viewing through the view finder must be closed only with the actuation of the release lever.

The aim of the present invention is the provision of a device which fulfills the stated function.

In accordance with the invention this is achieved due to the fact that the depressable release lever carries a rotatably mounted coupling lever, which when the release lever is in the rest position, through a coupling lug of the drive ring, holds said drive ring in a position corresponding to the open position of the blades, and on actuation of the release lever entrains it into a position, corresponding to the closed position of the blades. With the coupling lever there are preferably associated a spring which seeks to pivot the coupling lever into the path of the coupling lug and a fixed lug as stop, which on actuation of the release lever after the blades have reached the closed position pivots the coupling lever out of the path of the coupling lug, against the spring. For the opening of the blades for the purpose of viewing through the view finder, the drive ring has an opening arm.

The details of the invention may be seen from an illustrated and described example of embodiment.

FIGURE 1 shows the shutter in the rest position;
FIGURE 2 shows the shutter with the blades opened; and
FIGURE 3 shows the shutter in the state with the release lever completely depressed.

In a camera housing 1 which is only partly illustrated (see FIGURE 2) a view finder mirror 3 is mounted for rotation about a shaft 2, the spring 4 of which mirror seeks to draw the view finder mirror 3 out of the ray path 5. In the path of the view finder mirror 3 there lies an arresting lever 10, the spring 11 of which seeks to bring the nose 12 of the arresting lever 10 into engagement with the view finder mirror 3. In the path of the view finder mirror 3 there further lies an arm 13 of a releasable blocking lever 14 provided with a recess 15. With this blocking lever there is associated the spring 16.

A shutter base plate 18 is secured to the camera housing 1 by screws 17, and carries pivot pins 34 of shutter blades 19. Drive pins 21 engage in slots 20 of the blades 19 and are arranged on a drive ring 22, which possesses a coupling lug 23 and an opening arm 24. Between a fixed point on the shutter base plate 18 and the opening arm 24 there is connected a drive spring 25. The coupling lug 23 lies in the path of a coupling lever 27 rotatably mounted on a shutter release lever 26. A torsion spring 28 of the coupling lever 27 seeks to place a pin 29 mounted on the coupling lever against the periphery of the depression lever 26. In the running-off path of a nose 30 of the coupling lever 27 there is provided a lug 31 fixed to the shutter base plate 18. A return spring 32 holds the release lever 26 in the rest position.

The manner of operation of the device is as follows:

When the shutter is in the rest position the individual parts assume the position as shown in FIGURE 1. The coupling lever 27 still lies against the coupling lug 23, so that there is not yet a connection between the release lever 26 and the drive ring 22. Thus actuation of the depression lever 26 remains without effect. In the operation of the film winding mechanism (not shown) the opening arm 24 is rotated in the counter-clockwise direction (FIGURE 2) and the blade drive ring 22 is pivoted against the spring 25, so that the blades 19 move into the open position. The coupling lever 24 is then free to rotate under the influence of the spring 28 and comes into the path of the coupling lug 23 which is held against the lever 24 by the spring 25. The coupling lever 27 thereby holds the drive ring 22 in the position corresponding to the open position of the blades 19 for the purpose of viewing through the aperture.

The shutter is now ready for an exposure to be made.

By rotation of the release lever 26 in the direction of the arrow the exposure operation is initiated. The coupling lever 27 first pushes the drive ring 22 before it, through the coupling lug 23. In this movement the blades 19 close and the drive spring 25 is further loaded. Towards the end of the travel of the release lever 26 (FIGURE 3) the opening arm 24 strikes upon the arresting lever 10 (see FIGURE 2), whereby the view finder mirror 3 is liberated. Furthermore, the opening arm 24 has dropped into the recess 15 of the blocking lever 14 and the coupling lever 27 has been pivoted out of the path of the coupling lug 23 due to striking of its cam 30 upon the lug 31 (FIGURE 3). Only when the view finder mirror 3 springs back out of the optical ray path does it strike upon the operating arm 13 of the blocking lever 14 and rotates the latter against the spring 16. Thus the recess 15 comes out of engagement with the opening arm 24 so that under the action of the drive spring 25 the drive ring 22 can run off and cause the blades 19 to open and close the light passage aperture.

We claim:

1. In a photographic between-the-lens mirror reflex camera having a housing, an objective lens mounted in the housing, a reflex mirror mounted in the housing and movable into the light path of the objective lens, spring means for urging said mirror in a direction to bring the mirror out of said light path, a mechanism for moving said mirror into the light path, and first catch means mounted in the housing for releasably holding said mirror in the light path, the provision of a plurality of light aperture shutter blades pivotally mounted in the housing, a blade driving element operatively connected to said shutter blades and operatively connectible with said mechanism which moves said mirror into the light path, spring means arranged between a fixed point on the housing and said driving element, a projection extending from said driving element, a shutter release member arranged for rotation in the housing, a coupling lever pivotally mounted on said release member and capable of movement into the path of said projection for driving engagement therewith, said blade driving element being capable of movement from its normal rest position, where the shutter blades close to the light aperture, into a first position against the action of said spring means by means of the mechanism which moves said mirror into the light path, in which first position the shutter blades are open, and on continued movement, by way of the release member and the coupling lever, into a second position where the shutter blades are closed, and second catch means pivotally mounted in said housing for releasably holding said blade driving element in its second position, said second catch means being rotatable by said mirror when the latter moves out of the light path to release said blade driving element.

2. In a photographic between-the-lens mirror reflex camera having a housing, an objective lens mounted in the housing, a reflex mirror mounted in the housing and movable into the light path of the objective lens, spring means for urging said mirror in a direction to bring the mirror out of said light path, a film winding-on mechanism operatively connectible with the mirror for moving said mirror into the light path, and first catch means mounted in the housing for releasably holding said mirror in the light path, the provision of a plurality of light aperture shutter blades pivotally mounted in the housing, a blade driving ring operatively connected to said shutter blades and operatively connectible with said film winding-on mechanism, spring means arranged between a fixed point on the housing and said driving ring, a projection extending from said driving ring, a shutter release member arranged for rotation in the housing, a coupling lever pivotally mounted on said release member and capable of movement into the path of said projection for driving engagement therewith, said blade driving ring being capable of movement from its normal rest position, where the shutter blades close the light aperture, into a first position against the action of said spring means by means of the film winding-on mechanism, where the shutter blades are open, and on continued movement, by way of the release member and the coupling lever, into a second position where the shutter blades are closed, and second catch means pivotally mounted in said housing for releasably holding said blade driving ring in its second position, said second catch means being rotatable by said mirror when the latter moves out of the light path to release said blade driving ring.

3. In a photographic between-the-lens mirror reflex camera having a housing, an objective lens mounted in the housing, a reflex mirror mounted in the housing and movable into the light path of the objective lens, spring means for urging said mirror in a direction to bring the mirror out of said light path, a film winding-on mechanism operatively connectible with the mirror for moving said mirror into the light path, and first catch means mounted in the housing for releasably holding said mirror in the light path, the provision of a plurality of light aperture shutter blades pivotally mounted in the housing, a blade driving ring operatively connected to said shutter blades and operatively connectible with said film winding-on mechanism, spring means arranged between a fixed point on the housing and said driving ring, a first projection extending from said driving ring, a shutter release member arranged for rotation in the housing, a coupling lever pivotally mounted on said release member and capable of movement into the path of said first projection for driving engagement therewith, said blade driving ring being capable of movement from its normal rest position, where the shutter blades close the light aperture, into a first position against the action of said spring means by means of the film winding-on mechanism, where the shutter blades are open, and on continued movement, by way of the release member and the coupling lever, into a second position where the shutter blades are closed, second catch means pivotally mounted in said housing for releasably holding said blade driving ring in its second position, and a second projection on said blade driving ring, which projection is engageable with said first catch means to release the mirror when the driving ring is moved into its second position, said second catch means being rotatable by said mirror when the latter moves out of the light path, to release said blade driving ring.

4. In a photographic between-the-lens mirror reflex camera having a housing, an objective lens mounted in the housing, a reflex mirror mounted in the housing and movable into the light path of the objective lens, spring means for urging said mirror in a direction to bring the mirror out of said light path, a film winding-on mechanism operatively connectible with the mirror for moving said mirror into the light path, and first catch means mounted in the housing for releasably holding said mirror in the light path, the provision of a plurality of light aperture shutter blades pivotally mounted in the housing, a blade driving ring operatively connected to said shutter blades and operatively connectible with said film-winding-on mechanism, spring means arranged between a fixed point on the housing and said driving ring, a first projection extending from said driving ring, a second projection extending from said driving ring, a shutter release member arranged for rotation in the housing, a coupling lever pivotally mounted on said release member and capable of movement into the path of said first projection for driving engagement therewith, said blade driving ring being capable of movement from its normal rest position, where the shutter blades close the light aperture, into a first position against the action of said spring means by means of the film winding-on mechanism, where the shutter blades are open, and on continued movement, by way of the release member and the coupling lever, into a second position where the shutter blades are closed, and second catch means pivotally mounted in said housing for releasably holding the second projection on said blade driving ring to hold the latter in its second position, said second projection being engageable with said first catch means to release the mirror when the driving ring is moved into its second position, and said second catch means being rotatable by said mirror when the latter moves out of the light path to release said blade driving ring.

5. In a photographic between-the-lens mirror reflex camera having a housing, an objective lens mounted in the housing, a reflex mirror mounted in the housing and movable into the light path of the objective lens, spring means for urging said mirror in a direction to bring the mirror out of said light path, a film winding-on mechanism operatively connectible with the mirdor for moving said mirror into the light path, and first catch means mounted in the housing for releasably holding said mirror in the light path, the provision of a plurality of light aperture shutter blades pivotally mounted in the housing, a blade driving ring operatively connected to said shutter blades and operatively connectible with said film-winding-on mechanism, spring means between a fixed point on the housing and said driving ring, a first projection extending from said driving ring, a second projection extending from said driving ring, a shutter release member arranged for rotation in the housing, a coupling lever pivotally mounted on said release member and capable of movement into the path of said first projection for driving engagement therewith, a spring element connected with said coupling lever for urging said lever into the path of said first projection, a nose provided on said coupling lever, a fixed arm mounted in the housing and lying in the path of movement along which said nose travels on rotation of said driving ring, said blade driving element being capable of movement from its normal rest position, where the shutter blades close the light aperture, into a first position against the action of said spring means, by means of the film-winding-on mechanism, where the shutter blades are open, and on continued movement, by way of the release member and the coupling lever, into a second position where the shutter blades are closed, and second catch means pivotally mounted in said housing for releasably holding the second projection on said blade driving ring to hold the latter in its second position, said second projection being engageable with said first catch means to release the mirror when the driving ring is moved into the second position and said nose being engageable with said fixed arm with the driving ring in its second position to thereby pivot the coupling lever out of the path of said first projection, said second catch means being rotatable by said mirror when the latter moves out of the light path.

References Cited in the file of this patent

UNITED STATES PATENTS

| | | |
|---|---|---|
| 2,608,921 | Studdert | Sept. 2, 1952 |
| 2,926,575 | Gebele | Mar. 1, 1960 |
| 2,952,197 | Goshima | Sept. 13, 1960 |